Dec. 3, 1968  F. O. SKIDMORE  3,414,036
TIRE COOLING
Filed Aug. 24, 1966  2 Sheets-Sheet 1
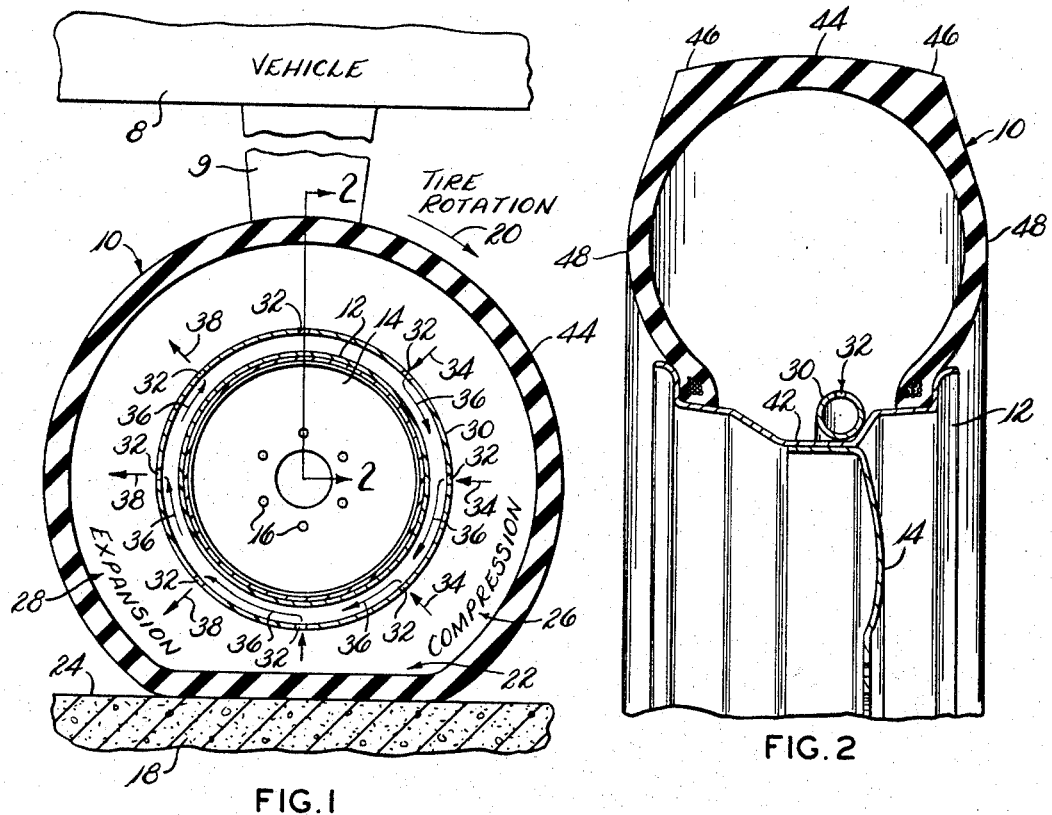
FIG.1
FIG.2
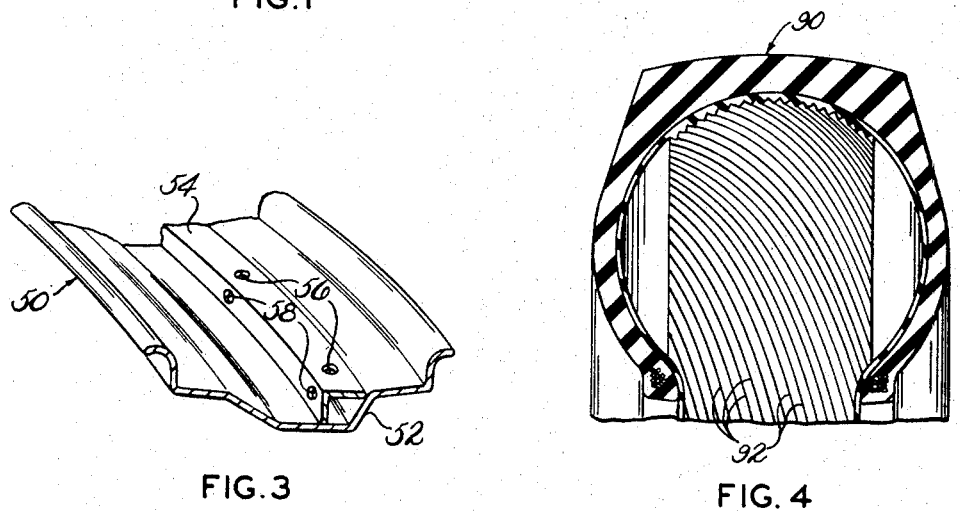
FIG.3
FIG.4
INVENTOR.
FRANK O. SKIDMORE
BY
  *Oldham & Oldham*
      ATTYS.

Dec. 3, 1968  F. O. SKIDMORE  3,414,036
TIRE COOLING
Filed Aug. 24, 1966  2 Sheets-Sheet 2

INVENTOR.
FRANK O. SKIDMORE
BY
*Oldham & Oldham*
ATTYS.

United States Patent Office 3,414,036
Patented Dec. 3, 1968

3,414,036
TIRE COOLING
Frank O. Skidmore, 2513 3rd St.,
Cuyahoga Falls, Ohio 44221
Continuation-in-part of application Ser. No. 418,515,
Dec. 15, 1964. This application Aug. 24, 1966, Ser.
No. 574,705
5 Claims. (Cl. 152—153)

ABSTRACT OF THE DISCLOSURE

A tire construction incorporating raised ribs on the internal surface of the tire spiralled around the toric axis of the tire so as to achieve a swirling, spiral circulation of the air inside the tubeless type pneumatic tire during rotational operation of the tire in association with an automobile at high speed so as to carry heat away from the tread and shoulder area portion of the tire to the sidewalls and mounting rim. The raised rib construction on the internal surface of the tire, particularly across the tread portion, achieves the objects of the invention.

---

This invention relates to a tire cooling means, and more particularly to a novel tire, to a novel tube, and/or to means placed internally of a pneumatic tire to effectively transfer heat from the crown and shoulder portions to the sidewalls and the mounting rim during rotational operation thereof, and is a continuation-in-part of my application Ser. No. 418,515 filed Dec. 15, 1964, now Patent No. 3,270,794 for Tire Cooling.

It is the general object of the invention to provide means positioned internally of an inflated pneumatic tire to effect circulation of the fluid therein pressuring the tire to effectively transfer heat from the tread, crown, and shoulder area portions to the sidewalls and mounting rim.

A further object of the invention is to provide rib means on but positioned internally of a pneumatic tire to continuously effectively circulate the air utilized for pressurization thereof from the tread portion of the tire over towards the sidewalls and/or rim for the tire as the tire rotates in use.

Other objects and advantages, together with the novel features of the construction and arrangement of the invention will appear as the description of the invention processes.

In the accompanying drawings:

FIGURE 1 is a vertical cross sectional view of a tubeless type pneumatic tire shown in rotating operational condition on the pavement, as carried by a vehicle which view illustrates one embodiment of the invention mounted to the rim internally of the tire to effect agitation and circulation of the fluid pressuring the tire;

FIGURE 2 is an enlarged vertical cross sectional view of the tire of FIGURE 1 more specifically showing the location of the fluid agitation and pressuring means, as taken on line 2—2 of FIGURE 1;

FIGURE 3 is an enlarged vertical cross sectional perspective view of a modified embodiment of the invention shown in FIGURES 1 and 2;

FIGURE 4 is an enlarged vertical cross sectional view of a tire employing a plurality of spirally positioned, substantially circumferentially extending raised ribs which achieve a spiral circulation of fluid pressuring the tire during rotational operation thereof;

Figure 5:
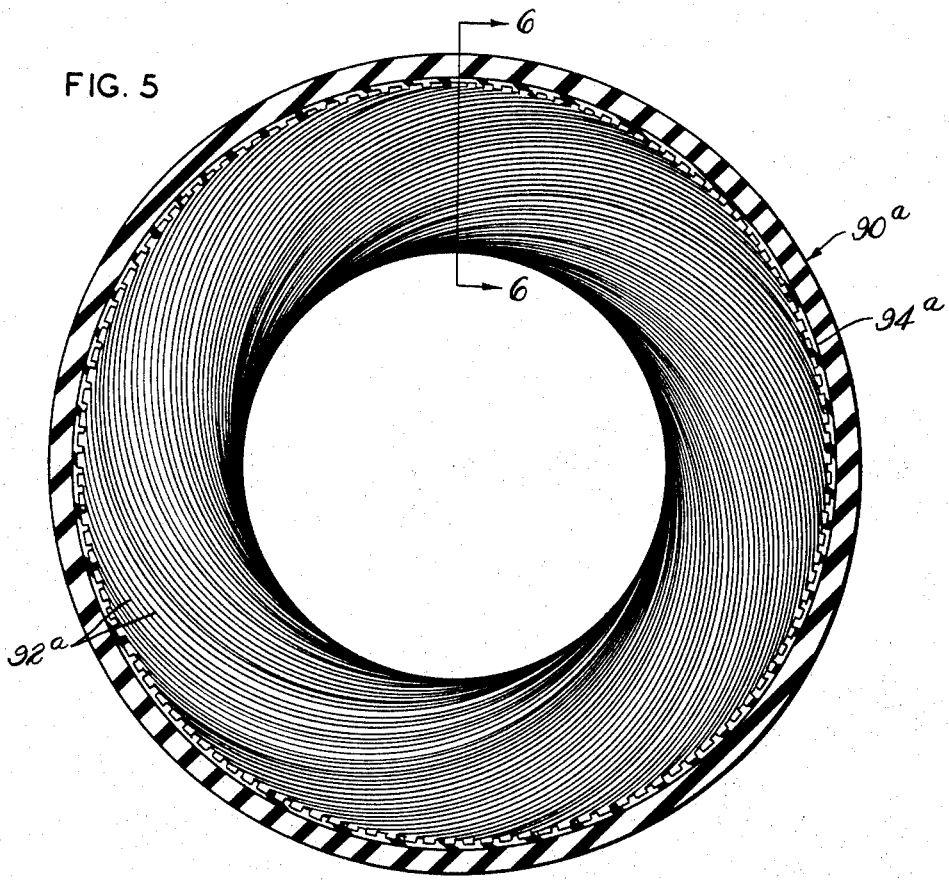
FIGURE 5 is an enlarged vertical cross sectional plan view of a tire employing a slight variation of the embodiment of FIGURE 4.

While it should be understood that the principles of the invention are adaptable to truck and bus pneumatic tires, and to tube type pneumatic tires, the features of the invention are particularly adaptable to tubeless type automobile tires, and hence it has been so illustrated and will be so described.

The present invention in the preferred embodiment thereof relates to a pneumatic tire having a tread and shoulder area portions, sidewalls and an endless bead around the radially inner circumference of each side thereof characterized by a plurality of raised ribs carried by the tire on the radially inner surface thereof, which ribs are spaced circumferentially relative to each other and extend across at least the radially inner surface of the tread area of the tire at an acute angle to the center plane of the tire whereby air inflating the tire is tended to be circulated in a spiral pattern with relation to the center plane of the tire during rotational operation of the tire thereby drawing heat away from the crown and shoulder areas and transferring it to the sidewalls and to the rim.

Cooling means fixed to rim

With reference to the form of the invention illustrated in FIGURE 1 of the drawings, the numeral 10 indicates generally a tubeless type pneumatic tire mounted to a conventional drop center rim 12, in the usual manner.

The tire 10 is used with a vehicle 8 and is mounted thereto by the support 9. The rim 12 has a drop center flange 14 with a plurality of bolt holes 16 adapted to mount over the brake hub of an automobile. It should be noted that the tire 10 is indicated in an operating condition as being loaded and passing over a roadway pavement 18 in a direction indicated by a tire rotation arrow 20. An exaggerated footprint area 22 is indicated along that point where the tire 10 contracts the surface 24 of the pavement 18. It should be understood that at high speed a tire rotating in the direction indicated by the arrow 20 and having a footprint area indicated by the area 22 will result in a specific area of fluid compression, as indicated by the numeral 26, while an area of expansion will be experienced in that portion of the internal area of the tire indicated by the numeral 28. The tire 10 will actually have a shorter radius from the tread portion to the center of the rim or hub 14 throughout the area of compression 26 than it will throughout the area of expansion 28. This is caused partially by the centrifugal force of the tire rotation, partially by the load on the tire, and partially by the forward movement of the vehicle carrying the tire. In other words, a bellows effect is constantly in action on the tire 10 causing the areas of compression 26 and expansion 28.

Therefore, in this embodiment, the objects of the invention are achieved by utilizing the compression area 26 and the expansion area 28 in conjunction with an endless tube 30 mounted in substantially fixed relationship to the rim 12 and extending circumferentially therearound. The tube 30 is provided with a plurality of small holes, indicated generally by the numeral 32, at substantially equally spaced circumferential distances therearound. The invention further contemplates that the holes may be between about ⅛ to about ½ inch in diameter, with between about 4 to about 24 holes spaced therearound. Preferably, it appears that a satisfactory fluid agitation and circulation is obtained utilizing eight ¼ inch holes.

During rotational operation of the tire 10, the area of compression 26 will force fluid in through the holes 32 in the tube 30, as indicated generally by the arrows 34. The fluid forced into the tube 30 as indicated by the arrows 34 causes a flow of fluid in the tube 30 as indicated by the arrows 36. This fluid flow will extend around to the area of expansion 28 causing small puffs or jets of fluid to be expelled therefrom, as indicated by the arrows 38. These puffs or jets of fluid 38 will effectively force the substantially cooler air around the sidewalls of the tire 10 effectively providing cooling thereof. The agitation to the fluid providing pressure to the tire 10 especially of the cooler fluid near the rim toward the tread in effect causes transfer of the heat generated at the tread and shoulder portions to the sidewalls and rim 12.

While it should be understood that the fluid normally associated with a pneumatic tire is simply air, this air does have weight and will experience fluid friction. Thus, during the rotational operation of the tire, the air will tend to be thrown centrifugally outwardly against the tire so that there is generally very little movement from the air layer adjacent the outward surface of the tire back and inwardly to effect heat transfer therefrom. Therefore, any means to agitate or effect circulation or movement of the air within a tire will transfer some heat from the tread, crown, and shoulder area portions back to the sidewall and mounting rim. Under operational tests, a tube operatively mounted to the rim in the manner illustrated in FIGURE 1 has been shown to provide between about a 10% to about a 25% decrease in the normal running temperatures at the tread and shoulder area portions of a tubeless pneumatic tire.

Referring now to the vertical cross sectional view of the tire, as shown in FIGURE 2, the position of the tube 30 relative to a well 42 of the rim 12 is clearly shown. The tube 30 may be made of any suitable material such as metal or plastic, and is secured in place by suitable adhesive welds, spring tension, or other convenient means. It should be noted that the only hole 32 being visible in this figure is directed substantially radially outwardly so as to puff or force fluid under pressure towards a tread portion 44 or shoulder portions 46 for the tire 10 to effect coling thereof. Some representative operating temperatures for a tire and wheel combination shown in FIGURES 1 and 2 for wheel rotation at about 70 m.p.h. with the outside air temperature at about 70° would be approximately 180° F. at the tread portion 44, 200° F. at the shoulder portions 46, about 125° F. at sidewall portions 48, about 100° F. on the rim 12, and about 90° F. on the drop center flange 14. During rotational operation of the tire 10 utilizing the tube 30 to effect agitation and circulation of fluid pressuring the tire, the temperature at the crown portions 46 will be reduced to about 180°·F., while at the tread portion 44 the temperature will reduce to about 160° F. Conversely, the temperature at the sidewall portions will increase to about 135° F., at the rim portion 12 will increase to about 115° F. and the drop center flange 14 will increase to about 105° F. Thus, the critical tread and shoulder area portions of the tire 10 will be reduced in operating temperature eliminating, or reducing the possibilities of layer separations, and tread wear thereby greatly increasing the life of the tire, and eliminating, or reducing the possibility of blowouts.

Referring now to the modification of the invention as shown in FIGURE 3, the numeral 50 indicates generally a rim having a well 52 formed therein with an L-shaped metal member 54 welded into position on the well 52 so as to effectively create an endless hollow chamber extending circumferentially around the well 52. Thus, usually a seam weld along each edge of the member 54 will be used to effect positioning thereof, although other suitable securing means might be used. A plurality of holes 56 may be provided on the top of the member 54, and other holes 58 may be directed from the side thereof. Again, the operation of this modification is similar to that described for the tube 30 with reference to FIGURES 1 and 2. Fluid under pressure in a tubeless pneumatic tire will be forced into the holes on the compression section, or side of the tire during rotational operation of the tire wheel combination and forced outwardly through the holes in puffs or jets on the expansion side. This modification merely represents what might be a simpler manufacturing process for wheel and rim manufacturers, than that disclosed by the separate tube 30 in FIGURES 1 and 2.

*Rib type cooling principle*

Figure 6:
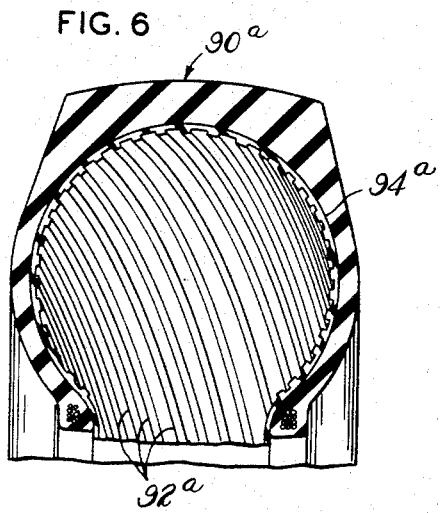
FIGURE 6 is an enlarged vertical cross sectional view of the tire of FIGURE 5 taken substantially on line 6—6 thereof.

Referring now to the embodiments of the invention illustrated in FIGURES 4–7, these embodiments are particularly adapted to either tube or tubeless type tires, and might be the most economically feasible, and probably the most effective method of cooling the tread and shoulder area portions of a tire. More specifically, with reference to FIGURE 4, the numeral 90 indicates generally a pneumatic tire. A plurality of raised ribs indicated generally by the numeral 92 are formed on the inside surface of the tire, if tubeless, or on the inside surface of a tube, if a tube is used. The raised ribs 92 may be of generally triangular cross sectional shape, although a square, rectangular, or concave cross sectional shape, as particularly shown in FIGURES 5, 6 and 7, might be more desirable. The ribs 92 are of a stair tread rib design so as to go continuously from valley to peak and back to valley again, and extend in a helically spiral arrangement around the inside surface of the tire. The ribs may vary in angle to accommodate various sizes of tires. It is contemplated that the ribs will extend from less than half to a substantial distance of the full circumference of the tire. As shown in FIGURE 4, the ribs may extend from shoulder to shoulder of the tire. If desired the ribs may extend from bead to bead as shown in FIGURE 6. The number of ribs, angle of ribs and height of ribs may vary to accommodate practical manufacturing standards.

The exact size and cross sectional configuration of the ribs 92, 92a and 92b will be dependent on the size of the tire, and the desired amount of circulation of the fluid providing pressure thereto. For example, the ribs might be between about $\frac{1}{32}$ inch high to about $\frac{1}{2}$ inch high, and between about $\frac{1}{16}$ inch in width to about 1 inch in width.

In rotational operation, a pneumatic tire such as the tire 90 in FIGURE 4, will normally be inflated with air which has some weight. The weight of the air will tend to throw it outwardly against the tread and shoulder area surface because of centrifugal force during rotational operation. Fluid friction between the skin of the tire 90 and the air will tend to drag the air along at substantially the same rotational speed as the tire 90. However, because of the necessary losses in fluid friction, and the up and down land surface speed normally associated with vehicular travel, the fluid pressure mass will not rotate at exactly the same speed as the tire. Thus, there is some relative circumferential movement between the fluid pressuring the pneumatic tire 90 and the tire itself. Thus, the purpose of the raised ribs 92 is to take advantage of the relative movement between the fluid pressuring the tire 90 and the tire itself by causing the fluid to follow the path of the ribs 92 during this relative movement effecting a corkscrew or helical twisting circulatory movement to the fluid under pressure as it moves relative to the tire during rotational operation thereof. This also might be described as a circulatory rotation of the fluid under pressure about the toric axis of the tire. Thus, in this manner, the hot air or fluid adjacent the tread, crown, and shoulder portions will be swirled or circulated down adjacent to the sidewalls and rim portions to effectively transfer its heat through and to these portions so that when it again swirls and circulates back past the tread and shoulder portions, it will be cooled and effect a cooling to these portions of the tire. Testing utilizing this design, with either a substantially triangular or rectangular cross sectional shape to the raised ribs, has proven that at least about 5% to about a 10% heat reduction in the tread and shoulder portions of a pneumatic tire may be obtained because of the internal circulation of the air or fluid under pressure in the pneumatic tire during rotational operation thereof.

Figure 7:
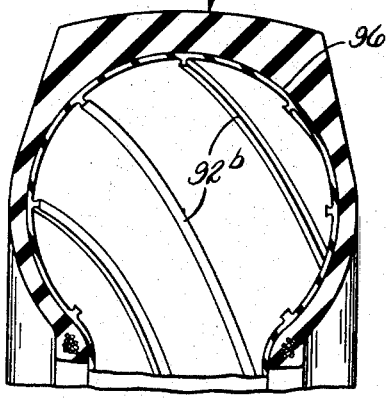
FIGURE 7 is a vertical cross sectional view of a tire, similar to FIGURE 6, but utilizing raised ribs having a concave cross sectional configuration to also effect a helical spiraling circulation to the fluid effecting pressuring thereof during rotational operation.

FIGURES 5 and 6 illustrate the raised ribs 92a which have been formed from a thin rubber layer 94a normally associated with a tubeless type pneumatic tire, and in essence acting as the tube. Note, also, that the helical coiled arrangement of the ribs 92a is at a relatively shallow angle to the center plane of the tire to provide a slow torsional or twisting or corkscrew motion to fluid under pressure in the tire as it moves relative to the tire 90. FIGURE 7 illustrates an inflatable inner tube 96 associated with a tube type pneumatic tire 90b, which tube 96 has been formed with a plurality of raised internal ribs 92b having concaved shaped sides. Further, it should be noted that the angular or helical relation of the ribs 92b is at a greater angle relative to the plane of the tire 90b than that of the ribs 92a as shown in FIGURE 6.

As stated above, the angular relationship of the ribs, is dependent upon their circumferential extending length, and will be dependent upon the desired rate or amount of cooling, the type of tire, and other factors. It has been found in practical experimental use involving this principle that eight raised ribs extending substantially about 75% of the circumferential distance around the radially inner surface of a tubeless pneumatic tire provides between about a 10 to about 20 percent reduction in the operating temperature at the tread and shoulder areas of the pneumatic tire. Another mathematical formula which has proved some merit in determining the angular relationship of the ribs, is that the rib length should be about 3½ times the distance from the bead to the crown of the tire, with this distance measured around the bead circumference. Thus, the rib would extend from the bead on one side a length substantially 3½ times times the radial distance from the bead to the crown of the tire and terminate at the bead on the other side of the tire.

It will be realized that the ribs in the tire and/or tube can be of any suitable length. Such ribs, for example, may extend only over the inner surface of the tread and terminate at or adjacent the shoulders of the tire. The ribs may be straight but are always inclined at an acute or small angle, say between about 10° to about 45° but preferably of between about 20 to 25° to the center plane of the tire. Of course, any desired number of ribs may be used in the tire and at most only require a slight thickening of the inner layer of rubber used to form the inner surface of the tubeless tire 90a as shown in the drawings. Such angular positioning of even straight ribs can be considered to be a spiral or helical positioning, particularly when the ribs extend down along the tire sidewalls.

It is a simple process to provide the curing bags now utilized in vulcanizing tubeless type pneumatic tires with recessed grooves therein so that the separate layer of uncured rubber acting as an inner tube in a tubeless tire, such as the layer 94a in FIGURE 6, may be thus formed by the grooves in the curing bag to provide the desirable raised ribs. Further, since these raised ribs are designed to be made from a resilient type rubber, they can be formed in a concave shape in cross section, such as the ribs 92b in FIGURE 7, and still be removable from a recessed groove in the curing bag normally associated with the vulcanizing process.

With reference to the tube 96 formed with the ribs 92b, as shown in FIGURE 7, this type of tube could be easily extruded so as to conveniently, and inexpensively provide raised ribs having the desired cross sectional shape. Of course, this would also apply to an extruded tire.

Thus, it is seen that the principle of raised ribs extending in a substantially spiral direction around the inside of a pneumatic tire, or the inside of a tube, will circulate the air or fluid under pressure in a pneumatic tire in a corkscrew or helically spiral direction to effectively transfer heat away from the tread, crown, and shoulder area portion of the tire to the sidewall and mounting rim to thereby increase tire life, and prevent the possibility of layer separations leading to blowouts.

While in accordance with the patent statutes only the best known embodiments of the invention have been illustrated and described in detail, it is to be particularly understood that the invention is not limited thereto or thereby.

I claim:

1. A tubeless type pneumatic tire for high speed performance having a tread crown and shoulder area portions, sidewalls and an endless bead around the radially inner circumference of each side thereof characterized by a plurality of raised ribs carried by the tire on the radially inner surface thereof, said ribs being spaced circumferentially relative to each other and extending across at least the radially inner surface of the tread crown area of the tire at an acute angle to the center plane of the tire of less than 45° whereby air inflating the tire is tended to be circulated in a spiral pattern about the toric axis of the tire during rotational operation of the tire thereby drawing heat away from the crown and shoulder area portions and transferring it through the sidewalls and to a supporting rim.

2. The combination according to claim 1 wherein the raised ribs define a substantially helical spiral shape on the radially inner surface of the tire and wherein the ribs are closely adjacent and substantially parallel to each other so there is a continuous peak and valley relationship between all of the raised ribs.

3. The combination according to claim 2 where the raised ribs extend only across the tread portion of the tire at an acute angle of between 20° to 25°.

4. A combination according to claim 1 where all the raised ribs have substantially concave shaped side surfaces to more readily direct air flow from the tread and shoulder area portion of the tire to other portions of the tire assembly during rotative operation of the tire.

5. A combination according to claim 1 where the angle of the raised ribs defining the helical spiral shape relative to the tire is between 20° to 25° dependent upon their circumferential length around the tire, and where the number of ribs and the circumferential length and angle of the ribs may be appropriately varied to provide the desired helical spiral circulatory movement to the fluid under pressure with in the tire about the toric axis thereof during rotational operation of the tire.

References Cited

UNITED STATES PATENTS

| 1,412,535 | 4/1922 | Martin | 152—330 |
|---|---|---|---|
| 2,166,927 | 7/1939 | Brunswick | 152—153 |
| 2,678,468 | 5/1954 | Smith | 152—350 |
| 3,208,500 | 9/1965 | Knipp et al. | 152—330 X |

FOREIGN PATENTS 550,892    1/1943    Great Britain.

ARTHUR L. LA POINT, *Primary Examiner.*

C. B. LYON, *Assistant Examiner.*